(12) United States Patent
Bensberg et al.

(10) Patent No.: US 10,275,508 B2
(45) Date of Patent: Apr. 30, 2019

(54) QUERY HINTS FOR CACHING AND REPLICATION

(71) Applicant: SAP SE, Walldorf (DE)

(72) Inventors: Christian Bensberg, Heidelberg (DE); Norman May, Karlsruhe (DE); Alexander Boehm, Sandhausen (DE); Juchang Lee, Seoul (KR); Sung Heun Wi, Gyeonggi-do (KR); Jeong Ae Han, Seoul (KR); Ki Hong Kim, Seoul (KR); Kyu Hwan Kim, Walldorf (DE); Chul Won Lee, Walldorf (DE); Andreas Kemmler, Boennigheim (DE); Christoph Glania, Mühlhausen (DE); Armin Risch, Hockenheim (DE); Kai Morich, Hockenheim (DE)

(73) Assignee: SAP SE, Walldorf (DE)

( * ) Notice: Subject to any disclaimer, the term of this patent is extended or adjusted under 35 U.S.C. 154(b) by 645 days.

(21) Appl. No.: 14/946,757

(22) Filed: Nov. 19, 2015

(65) Prior Publication Data

US 2017/0147671 A1    May 25, 2017

(51) Int. Cl.
*G06F 17/30* (2006.01)

(52) U.S. Cl.
CPC .... *G06F 17/30578* (2013.01); *G06F 17/3048* (2013.01)

(58) Field of Classification Search
CPC .................. G06F 17/30578; G06F 17/3048
USPC ....................................................... 707/613
See application file for complete search history.

(56) References Cited

U.S. PATENT DOCUMENTS

| | | | | |
|---|---|---|---|---|
| 7,677,441 | B2 * | 3/2010 | Bernstein | G06F 17/30348 235/379 |
| 7,739,262 | B2 * | 6/2010 | Larson | G06F 17/30522 707/713 |
| 9,336,272 | B1 * | 5/2016 | Thombre | G06F 17/30442 |
| 2006/0047721 | A1 * | 3/2006 | Narang | G06F 17/30575 |
| 2014/0223444 | A1 * | 8/2014 | Keeton | G06F 9/5011 718/104 |

OTHER PUBLICATIONS

James Cipar et al. 2012. LazyBase: trading freshness for performance in a scalable database. Proceedings of the 7th ACM european conference on Computer Systems (EuroSys '12). ACM, New York, NY, USA, 169-182. DOI=http://dx.doi.org/10.1145/2168836.2168854 (Year: 2012).*

* cited by examiner

*Primary Examiner* — Robert W Beausoliel, Jr.
*Assistant Examiner* — Arthur Ganger
(74) *Attorney, Agent, or Firm* — Mintz Levin Cohn Ferris Glovsky and Popeo, P.C.

(57) ABSTRACT

A method may include receiving a query for data to be provided by a database server, wherein the query includes an indication of a maximum lag. The method may further include determining whether a hint is available to apply to the query, wherein the hint affects an execution of the query. When no hint is available, a baseline database server may be selected to be the database server. When the hint is available, a replication server or a cache server may be selected to be the database server based on the hint and the maximum lag. The query may be processed at the selected database server.

20 Claims, 3 Drawing Sheets

QUERY HINTS FOR CACHING AND REPLICATION

TECHNICAL FIELD

The subject matter described herein relates to database queries and hints for changing the execution of database queries.

BACKGROUND

Data flow graphs comprise a plurality of nodes that define how a query is to be executed. For a given data flow graph and its nodes, rules can be used to decide various aspects of how the query is applied in an underlying database of a multi-level database management system. Applications that access the database generally provide higher level instructions that are converted to a query language such as SQL by a calculation engine or other intervening semantic layer of the database management system. The plurality of rules are generally applied globally and therefore may not provide a most optimized query plan for a specific query or set of queries generated by an application.

SUMMARY

Methods, systems, and computer readable media are disclosed. In one aspect there is a method. The method may include receiving a query for data to be provided by a database server, wherein the query includes an indication of a maximum lag. The method may further include determining whether a hint is available to apply to the query, wherein the hint affects an execution of the query. When no hint is available, a baseline database server may be selected to respond to the query in order to provide the latest database information to an application making the query. The hint may allow a database server to be used that provides data that is less "fresh" but "fresh" enough to meet the requirements of the application. When the hint is available, a replication server or a cache server may be selected to be the database server based on the hint and the maximum lag. The query may be processed at the selected database server.

In some variations, one or more of the features disclosed herein including the following features can optionally be included in any feasible combination. Selecting the database server may be based at least in part on the lag of the database server with a hint applied. The lag corresponding to a query with the hint applied may be less than or equal to the maximum lag. The hint may include an indication of a class, wherein the class is one of a plurality of classes associated with the hint. The class may identify a lag provided using the hint as long, short, or a quantitative value of time. When the hint includes the indication of the class short, the hint may cause the selected database server to be an asynchronous table replication server, wherein asynchronous table replication causes a lag of less than a few seconds. Asynchronous table replication may replicate one or more tables from the baseline database. When the hint includes the indication the class long, the hint may cause the selected database to have been produced as a cache, wherein the database produced as a cache has a lag between a few seconds and sixty minutes. Cache may be an aggregation of tables from the baseline database.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1 depicts a database query, in accordance with some example embodiments;

FIG. 2 depicts a process for processing a query using a hint, in accordance with some example embodiments; and FIG. 3 depicts an apparatus configured as a database server, in accordance with some example embodiments.

DETAILED DESCRIPTION

Different applications may have different needs with respect to the relative "freshness" of the data that is being used by the application. For example, an application may be able to use data that is updated every few hours or longer, while another application may need data that is updated every few minutes or nearly continuously. The data needed by the application may be stored in an original or baseline database that may be accessed by the application using queries. The data in the original or baseline database may be provided by an original or baseline database server that provides the data. A baseline database associated with an application contains the data (also referred to as actual data) as a primary storage, that is updated directly by applications and that follows the ACID constraints. Being the primary storage, the "baseline database" follows consistency rules including transactional consistency, snapshot isolation, and so on. The baseline database server may respond to queries made for the data needed by the application. For example, when no alternate database servers (snapshots) are available, the baseline database server may respond to all queries.

Alternate database servers may be provided to relieve the baseline database server from responding to queries. The alternate database servers may store and provide "snapshots" of the original or baseline database. A snapshot of the baseline database is a copy of the original database or portion of the original database taken at a certain time. The snapshots may be updated where some database servers provide snapshots taken at a slow rate and other database servers provide snapshots taken at a faster rate. For example, a cache view snapshot (also referred to herein as a cache view server) may provide snapshots taken approximately every 30 minutes. An asynchronous table snapshot (also referred to herein as an asynchronous table replication server) may provide snapshots taken approximately every couple of seconds.

The baseline database may provide better service than is needed by the application, or the baseline database may be slowed by too many queries or queries that take too many of the baseline database's computing or storage resources. For example, the baseline database may provide a snapshot of the entire database and includes the latest updates, which may be more than what is needed by the application. In another example, the database may be heavily loaded with queries causing the query response to be too slow for the requirements of the application. When the database provides more data freshness than is required by the application, or when the database is slowed, the database capability may be mismatched with the application. More data freshness may be provided by a database server (snapshot) that is updated more frequently than is needed by the querying application. To relieve the mismatch, a database cache and/or a database replication may be used. A database cache may be stored separately from the baseline database and may aggregate portions of a database that may be accessed via the cache. A database cache may be used for data that does not change very frequently. For example, a database cache may be used for data that changes on a time scale of 30 minutes or longer, for example.

A database may include one or more tables. A database table may be replicated using asynchronous table replication. An asynchronous table replication may be used for data that changes more frequently than data suitable for a cache. An asynchronous table replication may be used for data that changes on a time scale of a few seconds, for example. When queries from an application use a database cache or a replicated table, the baseline database is relieved from responding to those queries leaving the baseline database with added capability to serve other queries or allow the baseline database to be taken offline for a period of time to update or change the database.

A database may have changes or updates that are incorporated into the database periodically or intermittently. For example, a database may be updated once per update period. In some instances, there may be no changes to the database since the last update and so the database may be confirmed to be up to date despite there being no changes. The maximum time that is acceptable to an application between updates to a database, or since the database was last confirmed to be up to date, is referred to herein as a maximum lag. A query may be accompanied by a maximum lag set by the developer or application, or a database administrator. When the query is executed, a database may select one of one or more database servers to respond to the query. An indication of a maximum lag included with the query may determine which databases server(s) is acceptable from among the database servers that could respond to the query. For example, a query that has a maximum allowable lag of 30 minutes may use a database server that provides up to a 30 minute lag. A database server with a maximum lag of 30 minutes or less would be satisfactory. Different databases servers may provide different lags. In this example, the baseline database server could be used (if not overloaded) because the application was designed to operate using the baseline database server. A cache server may be used instead of the baseline database server so long as the cache is updated every 30 minutes or less. Asynchronous table replication server could be used instead of the baseline database server. A cache server or asynchronous table replication server may be referred to as servers that provide a "snapshot" because each represents a snapshot of the baseline database. A cache snapshot (cache view server) may have a longer lag than an asynchronous table snapshot (asynchronous table replication server). A cache and/or a replicated table may be hosted on the same physical hardware as each other, or may be hosted on different physical hardware from each other. The baseline database server may be hosted on the same or different hardware from a snapshot. Accordingly, when the query is processed, the baseline database server or a "snapshot" server may be selected that is able to respond to the query with a lag that is equal to or less than the maximum allowable lag.

The cost and/or complexity may be different for database servers that provide different lags. In some example embodiments, different database servers with different lags may contain the same or similar data. Because the query includes a maximum lag, a selection among database servers may be made based on lag. The selection may be performed by the application developer at design-time, a database administrator, an application, a query optimizer, and/or the like. The use of the lag indicator in the query may decouple the query from the selection of the data server source. In this way, the application layer may be decoupled somewhat from the lower-layer data sources, such as the database.

A query may be modified by a hint when the query is executed. A hint is not always available for a query. A hint may include a hint class that determines a lag and thus the corresponding database server that satisfies the lag of the application or its query. The processing of the query according to the hint may result in a lag that is shorter than or equal to the maximum allowable lag allowed by the query. For example, the processing of the query and hint may result in a database server being selected that provides a lag that is less than the maximum allowable by the application and query. For example, a snapshot providing a 10 second lag may be selected to respond to a query with a maximum allowable lag of 30 minutes. If no snapshot is available that satisfies the maximum lag, the query may access the baseline database (instead of a snapshot of that data).

Although the foregoing hint is related to the lag of a database, other hints are also possible. Another example of a hint includes a hint that affect the selection of a database server (or snapshot) based on the length of time taken for the database server to respond. A hint may be used to affect any aspect of executing a query.

In some example embodiments, multiple hints may be associated with a query. Hint classes may be associated with the hints. In some example embodiments, the hint classes may provide, with the appropriate database server, different lags and other features. For example, a hint class may provide a predetermined lag. A different class may provide a different lag. A class may include a parameter such as a time in seconds. Some classes may not have parameters such as a time (or frequency) value corresponding to a maximum lag.

Figure 1:
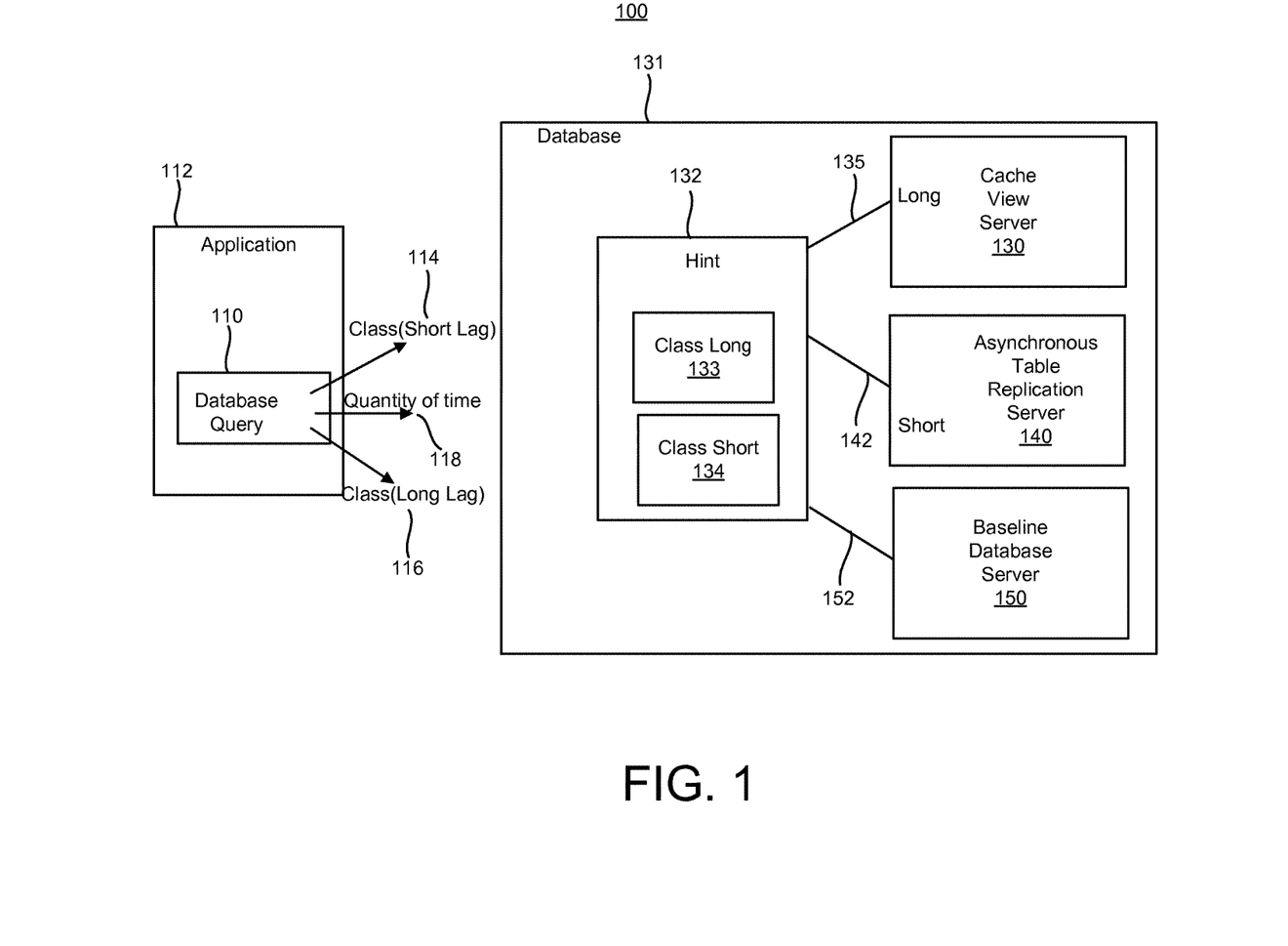

FIG. 1 depicts a system 100 including an application 112 and a database 131. The application 112 may generate a database query 110 in order to obtain data. The database query 110 may include an indication of whether the lag time for the query is long 114, short 116, or a predetermined value. Database 131 may include one or more database servers or other storage mechanisms, such as baseline database server 150, cache mode server 130 and/or asynchronous table replication server 140. Although FIG. 1 shows certain types of storage or database mechanisms, other types of database servers and/or devices may be used as well.

Database 131 may include one or more database servers. For example database 131 may include a baseline database server which may be an original database where the data is stored. Without hints or database servers 130 and/or 140, the data for application 112 may be stored in the baseline database server 150. Database 131 may also include cache view server 130 and/or asynchronous table replication server 140. The cache view server 130 may aggregate and store data from the baseline database server and may make the aggregate data available to queries instead of the baseline database server providing the data. The cache view server may have a retention period (or refresh interval) of several minutes to some hours. The asynchronous table replication server 140 may replicate and store data or tables from the baseline database server and make the replicated tables/data available to queries instead of the baseline database server providing the data. The asynchronous table replication server 140 may have a replicated table/data update rate of approximately a few seconds or less.

Application 112 may need some data stored at database 131. Application 112 may generate and send database query 110 to acquire the needed data. The query 110 may be sent to database 131. The query 110 may indicate a maximum allowable lag as a short lag 114, or a long lag 116, or a numerical quantity of lag 118 (in seconds, minutes, etc.). A default lag may include a quantity of seconds as the maximum allowable lag. The database 131 may receive the query and determine if the application and database are capable of using hints, and whether any hints are available to use with the query. A hint may affect the execution of the query by causing the selection of a database server in the database to respond to the query. For example, a hint may cause the query to be responded to by a database server selected based on a maximum lag allowable by the application. The database may also be selected based on relieving the baseline database from being required to respond to queries. For example, the baseline database server 150 may be heavily loaded with responding to queries that may cause the baseline database to slow due to memory of processing constraints. An application and query where a hint may be used may have the query responded to by one of the database servers other than the baseline database server. Having database server 130 or 140 respond to the query may relieve the baseline database server 150.

When the application and the query 110 can use a hint at database 131, the hint may include a class such as "long" or "short" described above, the database 131 may select the appropriate database server 130, 140, 150 (or snapshot as described above) to execute the query with the hint and class. Instead of "long" or "short" a query may include a numerical value representative of a maximum allowable lag in a quantity of seconds. Database 131 may select the database server 130, 140, or 150 based on the numerical value and the hint. Although this example describes the lag indicator as being a short lag indicator 114, a long lag indicator 116, or a numerical quantity of lag 118, other types of lags may also be used.

The hint 132 may modify how the query 110 is executed to satisfy the lag included in the query. To that end, the hint 132 may comprise one or more classes such as class long 133 or class short 134 each providing an option with respect to implementing the query using different lag times. For example, a class may be associated with a certain implementation of a database server that has a relatively long lag (and thus less frequently updated data), while another class may be associated with an implementation of a database server that has a relatively short lag (and thus more frequently updated data).

When the hint including a particular class is executed, an appropriate database server may be selected by database 131. The selected database server then responds to the query. For example, when a database query 110 includes a long lag indicator 116, a hint 132 may include class long 133 that may cause database 131 to select a cache view server 130 to respond to the query. The cache view server may provide a long time duration between updates, such as 3 hours, for example.

If the database administrator has not set-up a cache view server 130 but has set-up an asynchronous table replication server 140, the database 131 may select the asynchronous table replication server 140 to respond to the query with a long lag 133. A long lag query may normally be responded to by a cache view server, but in this example, because no cache view server has been set-up, the asynchronous table replication server 140 may be selected.

To illustrate with another example, when a database query 110 includes a short lag indicator 116, a hint 132 may include class short 134 that may cause database 131 to select an asynchronous table replication (ATR) server 140 to respond to the query. The hint 134 may thus trigger the database query 110 (which includes a short lag indicator 114) to be sent to that certain database, such as asynchronous table replication server 140. In response, asynchronous table replication server 140 may respond to the query. In the example of FIG. 1, asynchronous table replication server 140 may provide a relatively short time duration between updates, such as 2 seconds, for example, when compared to cache view server 130.

The cache view server 130 may comprise a database server that responds to a query for data. The cache view server 130 may include a snapshot that is updated less frequently (longer lag), when compared to the asynchronous table replication server 130. Database 131 may include more than one cache view server with different or the same corresponding lag periods. For example, a lag time may be 30 minutes to a few hours. The cache view server 130 may store at least one cache view generated from at least one transactional snapshot.

In some example embodiments, an application may require data that is updated or identified as unchanged at most a predetermined amount of time before a query (maximum lag). For example, an application developer may determine at design time the maximum allowable lag. In some example embodiments, the maximum lag may be determined by the application or type of data, or may be provided by an apparatus in a message, or from a database administrator. In some example embodiments, the same or similar application may store data in the cache view (with data having an age of 30 minutes to several hours) and/or store data in an asynchronous table replication. In some example embodiments, the same hints may be used for different applications in a uniform set of query hints. Application developers may use a uniform set of query hints with a variety of classes. Moreover, hints including a uniform set of hints facilitate the decoupling of applications from how a database is implemented. For example, the decoupling allows older applications to benefit from new database features that may be added without modifying hints by changing an application or database configuration.

In some example embodiments, different hints may provide different maximum lag times in seconds, and/or coarser grained lag classes. The maximum lag may correspond to a threshold time value. When this is the case, the application may prefer the response to the query to use a database server having data that is less than or equal to the threshold maximum lag value, such as short lag 114, long lag 116, or quantity of time 118 (depicted in FIG. 1). The following example hints use "ATR" as an abbreviation for "asynchronous table replication":

1. Use the short lag database if present (for example, "use ATR if present"). For example, if ATR 140 is available, ATR 140 may be used, resulting in a lag of a few seconds.

2. Use the long lag database if present (for example, "use Result Cache, if present, otherwise use ATR as fallback"). In this example, if the cache view server 130 is available, cache view server 130 will be used to respond to the database query. If cache view server 130 has to be re-built (if it was outdated or not yet created), the rebuilding may be performed before responding to the query.
3. If no cache can be used, but ATR 140 is available, ATR may used.
4. If both cache 130 and ATR 140 are available and can be used, select one. In some example embodiments, an application or database server configuration may control the decision process.
5. Use caching if cache was rebuilt less than predetermined amount of seconds ago.
6. If neither caching nor replication is configured by the database administrator, the database 131 will use the baseline database server to process query 110.

In some example embodiments, the first two hints (1 and 2 above) for ATR may also include a maximum lag specified by the application in seconds. ATR may be chosen if the replication has a delay of less than a predetermined number of seconds.

In some example embodiments, classes associated with one or more hints, such as the hints detailed below, may include specific values or coarser grained classes such as "long" and/or "short." In some example embodiments, the classes are parameters of the hint. For example, a hint is shown below with associated classes.

RESULT_LAG is a name of a hint that affects the freshness of the data. The RESULT_LAG hint may include a class name. Some class names may also include a parameter such as a time in seconds. The hint may be expressed as:
    WITH HINT RESULT_LAG("<class_name>", [seconds])

Examples of pseudo configuration corresponding to a various classes may include:

```
[lag_hint_config_atr]
    mechanismOrder = atr
``` where, [lag_hint_config_atr] expresses a class named "atr," and "mechanismOrder=atr" means that ATR is used as the database server.

Another example of a class may include:

```
[lag_hint_config_short]
    mechanismOrder = atr
``` where, [lag_hint_config_short] expresses a class named "short," and "mechanismOrder=atr" means that ATR is used as the database server.

Another example of a class may include:

```
[lag_hint_config_long]
    mechanismOrder = resultCache,atr
    [result_cache_max_seconds = 1800 ]
``` where, [lag_hint_config_long] expresses a class named "long," and "mechanismOrder=resultCache, atr" means that a cache view server of ATR may be used as the database server, and "result_cache_max_seconds=1800" means that the maximum lag for a cache view server is 1800 seconds, but may be overridden in some examples.

Another example of a class may include:

```
[lag_hint_config_cache]
    mechanismOrder = resultCache
    [result_cache_max_seconds = 1800]
``` where, [lag_hint_config_cache] expresses a class named "cache," and "mechanismOrder=resultCache" means that a cache view server may be used as the database server, and "result_cache_max_seconds=1800" means that the maximum lag for a cache view server is 1800 seconds, but may be overridden in some examples Examples of the hint including an associated class include:

```
WITH HINT RESULT_LAG("long"), and
WITH HINT RESULT_LAG("cache", 3000)
``` where, "WITH HINT RESULT_LAG("long")" expresses the hint with "long" as described above is selected, and "WITH HINT RESULT_LAG("cache", 3000)" expresses the hint with "cache" and 3000 seconds selected as described above. The foregoing classes are illustrative. Other classes and hints are also possible.

In some example embodiments, the lag for ATR may be retrieved enabling the configuration to be adapted. For example,

```
[lag_hint_config_long]
    mechanismOrder =resultCache,atr
    [atr_max_seconds = 1800 -- may be overriden]
    [result_cache_max_seconds = 1800 -- may be overridden]
``` where, [atr_max_seconds] means that the maximum lag for an ATR server is 1800 seconds, but may be overridden in some examples, and "result_cache_max_seconds=1800" means that the maximum lag for a cache view server is 1800 seconds, but may be overridden in some examples.

In some example embodiments, some of the classes may be consistently available, for example, the four classes "short," "long," "atr," and "cache." In some example embodiments, an application may define a new class, create its own configuration (e.g., deploy time), and may give users/administrators the freedom to change the behavior for applications individually.

In some example embodiments during query preparation, the database (or database service) may determine whether asynchronous table replication or a cached view should be used. In some example embodiments, asynchronous table replication may be accessed rather than cache.

Asynchronous table replication server 130, may provide asynchronous table replication using a database manipulation language (DML). This replication may be of selected tables along with transactional information. Asynchronous replicas may be created where a given table may be only self-consistent, but the replica tables may be transactionally consistent. For example, when a line item table has been replicated with the rows visible, the corresponding rows in a header table may also be visible. Asynchronous table replication may provide a good "quality of service" meaning that replicas are refreshed in less than 2 seconds. After a server crash, asynchronous table replication may replicate a large volume to get to the latest state.

To illustrate further, asynchronous table replication replicates selected tables rather than an entire database (system replication). Asynchronous replication refers to write operations on those tables that are replicated asynchronously with little or no impact to the response time of source write transactions. For example, a source write transaction may commit without waiting for propagation to the replica. Transactional replication may also be performed. For example, read queries may be routed to a replica may not see an up-to-date committed result due to the asynchronous replication. In some example embodiments, cross-table transactional consistency may be likely by preserving the source transaction boundary and their commit order on a log replay at the replica. Some example implementations include parallel log replay meaning although the read queries routed to the replica may see outdated data, propagation delay is minimized by parallel log replay by multiple replayer threads at the replica side.

Figure 2:
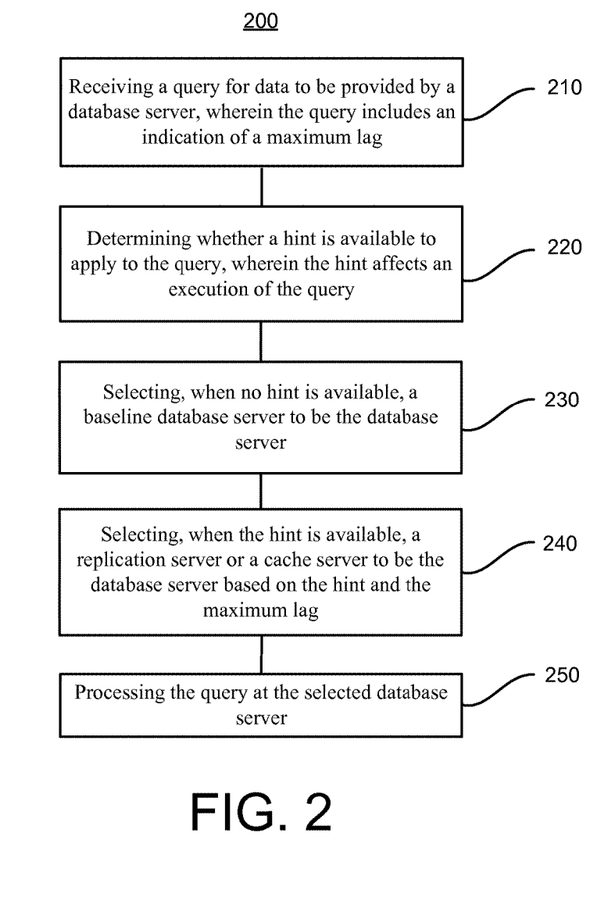

FIG. 2 depicts processing a query using a hint, in accordance with some example embodiments. At 210, a query may be received. At 220, whether a hint is available to apply to the query may be determined. At 230, when no hint is available, a baseline database server may be selected. At 240, when the hint is available, a replication server or a cache server may be selected. At 250, the query may be processed. The description of FIG. 2 also refers to FIG. 1.

At 210, a query may be received at a database from an application. The database, such as database 131 may include one or more database servers. The database servers may include a baseline database server 150, cache view database server 130, and/or an asynchronous table replication server 140 as described above. The database may select which of the different database servers in the database may provide the data required by the application. The different database servers may provide the data with different lags. The query may include an indication of a maximum lag that is allowable by the application for the data requested in the query. The indication may be a quantitative value such as "30 minutes," or may be an indication such as "long," or "short." In some example embodiments, the maximum allowable lag time for the query is included as a configuration parameter included with the hint as described above. When both the query and the hint configuration include maximum allowable lag times, the smallest time may be selected.

At 220, the database may determine whether one or more hints are available to apply to the query. Hints may affect the execution of the query by causing the database to select a database server that is capable of responding according to an indication provided with the query. For example, a hint such as RESULT_LAG described above may be available. Other hints may be available in addition to RESULT_LAG or in place of RESULT_LAG.

At 230, when no hints are available, the database may sect a baseline database server such as baseline database server 150 to respond to the query. In some example embodiments, when the query includes a quantity of time as a maximum lag, or an indication such as "long" or "short" the baseline database server may or may not be able to respond according to the indication. Without an available hint, the baseline database server may be selected to respond to the query.

At 240, when the query includes an indication of lag and a hint is available, a database server may be selected by database 131 to respond to the query. The selected database server such as cache view server 130 or asynchronous table replication server 140, may be based on the indication included with the query and/or the hint. For example, when the hint RESULT_LAG is available, and the query includes a quantitative number of seconds for the maximum lag, 2 seconds for example, an asynchronous table replication server may be selected to respond to the query. The database may select a database server that is capable of providing a response to the query with the maximum lag, or the database server may select a database server that is capable of provided a response with a smaller lag. For example, database 131 may select an asynchronous table replication server (with a lag time of a few seconds) to respond to a query requiring a 30 minute lag time when a cache view server would be capable or responding but may not be available. In another example, the selected database server may be capable of providing a class that provides a lag time that is at most the maximum lag time allowable by the query. A query requiring a maximum 30 minute lag time may have the query serviced by a database server with a 30 minute lag such as a cache view server 130, or by a database server with less lag such as an asynchronous table replication server 140 that provides a smaller lag than the cache view server. A hint may accept one or multiple classes. For example, multiple classes were described above with respect to FIG. 1 that provide different lags.

At 250, the query may be processed or responded to by the selected database server.

Figure 3:
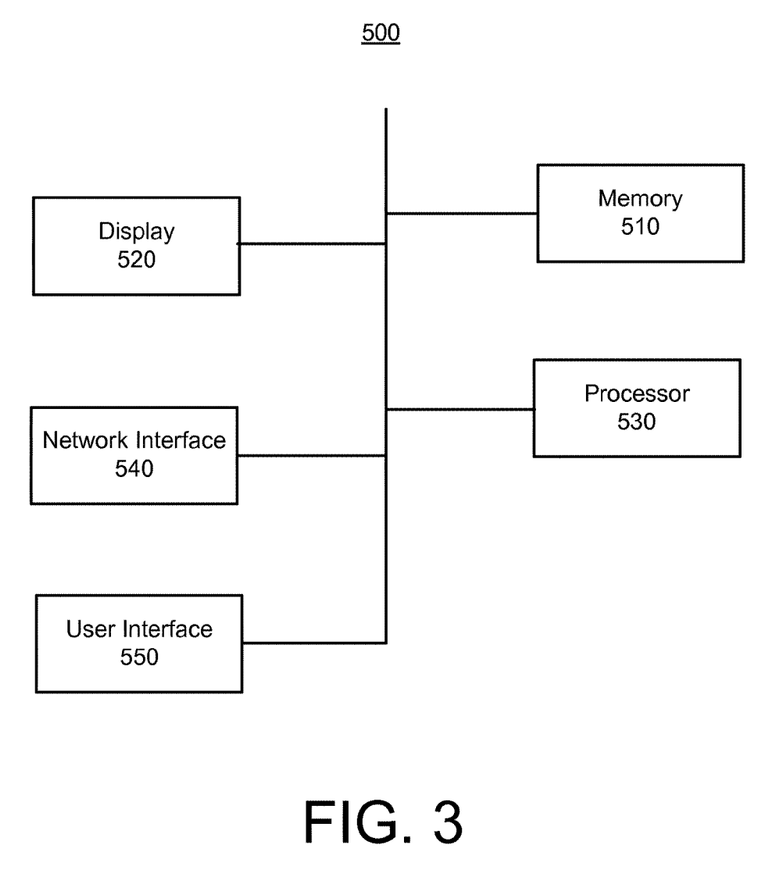

FIG. 3 depicts a computing apparatus 500, in accordance with some example embodiments. An apparatus consistent with FIG. 3 may implement application 112, and/or database 131 including hints 132, 133, baseline database server 150, cache view server 130, and/or asynchronous table replication server 140. Computing apparatus 500 may perform the processes described with respect to FIG. 2.

Computing apparatus 500 may include one or more processors such as processor 530 to execute instructions that may implement operations consistent with FIGS. 1-2. Apparatus 500 may include memory 510 to store executable instructions and/or information. Memory 510 may include solid-state memory, solid state disk drives, magnetic disk drives, or any other information storage device. Memory 510 may provide storage for a database. Apparatus 500 may include a network interface 540 to a wired network or a wireless network. Wireless networks may include WiFi, WiMax, and cellular networks (2G/3G/4G/5G), and/or any other wireless network. Apparatus 500 may user interface 550 such as a keyboard, mouse, or other interface that may include a touchscreen integrated with display 520.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving a query for data to be provided by a database server, wherein the query includes an indication of a maximum lag;
   determining whether a hint, at a database management system, is available to apply to the query having the maximum lag, wherein the hint affects an execution of the query;
   selecting, when no hint is available, a baseline database server to be the database server;
   selecting, when the hint is available, a replication server or a cache server to be the database server based on the hint and the maximum lag; and
   processing the query at the selected database server.

2. The method of claim 1, wherein the selecting is based at least in part on the lag of the database server with the hint applied being less than or equal to the maximum lag.

3. The method of claim 1, wherein the hint includes an indication of a class, wherein the class is one of a plurality of classes associated with the hint, and wherein when the class identifies a lag provided using the hint as long, short, or a quantitative value of time.

4. The method of claim 3, wherein when the hint includes the indication of the class short, the hint causes the selected database to have been produced by asynchronous table replication, wherein asynchronous table replication causes a lag of less than a few seconds.

5. The method of claim 4, wherein asynchronous table replication replicates one or more tables from the baseline database.

6. The method of claim 3, wherein when the hint includes the indication of the class long, the hint causes the selected database to have been produced as a cache, wherein the database produced as a cache has a lag between a few seconds and sixty minutes.

7. The method of claim 6, wherein the cache is an aggregation of tables from the baseline database.

8. A non-transitory computer readable medium containing executable instructions, that when executed by at least one processor perform operations comprising:
   receiving a query for data to be provided by a database server, wherein the query includes an indication of a maximum lag;
   determining whether a hint, at a database management system, is available to apply to the query having the maximum lag, wherein the hint affects an execution of the query;

selecting, when no hint is available, a baseline database server to be the database server;

selecting, when the hint is available, a replication server or a cache server to be the database server based on the hint and the maximum lag; and processing the query at the selected database server.

9. The non-transitory computer readable medium of claim 8, wherein the selecting is based at least in part on the lag of the database server with the hint applied being less than or equal to the maximum lag.

10. The non-transitory computer readable medium of claim 8, wherein the hint includes an indication of a class, wherein the class is one of a plurality of classes associated with the hint, and wherein when the class identifies a lag provided using the hint as long, short, or a quantitative value of time.

11. The method of claim 10, wherein when the hint includes the indication of the class short, the hint causes the selected database to have been produced by asynchronous table replication, wherein asynchronous table replication causes a lag of less than a few seconds.

12. The method of claim 11, wherein asynchronous table replication replicates one or more tables from the baseline database.

13. The method of claim 10, wherein when the hint includes the indication of the class long, the hint causes the selected database to have been produced as a cache, wherein the database produced as a cache has a lag between a few seconds and sixty minutes.

14. The method of claim 13, wherein the cache is an aggregation of tables from the baseline database.

15. A system comprising:

at least one processor;

at least one memory including executable code, wherein the at least one processor, the at least one memory, and the executable code cause operations comprising:

receiving a query for data to be provided by a database server, wherein the query includes an indication of a maximum lag;

determining whether a hint, at a database management system, is available to apply to the query having the maximum lag, wherein the hint affects an execution of the query;

selecting, when no hint is available, a baseline database server to be the database server;

selecting, when the hint is available, a replication server or a cache server to be the database server based on the hint and the maximum lag; and processing the query at the selected database server.

16. The system of claim 15, wherein the selecting is based at least in part on the lag of the database server with the hint applied being less than or equal to the maximum lag.

17. The system of claim 15, wherein the hint includes an indication of a class, wherein the class is one of a plurality of classes associated with the hint, and wherein when the class identifies a lag provided using the hint as long, short, or a quantitative value of time.

18. The method of claim 17, wherein when the hint includes the indication of the class short, the hint causes the selected database to have been produced by asynchronous table replication, wherein asynchronous table replication causes a lag of less than a few seconds.

19. The method of claim 18, wherein asynchronous table replication replicates one or more tables from the baseline database.

20. The method of claim 17, wherein when the hint includes the indication of the class long, the hint causes the selected database to have been produced as a cache, wherein the database produced as a cache has a lag between a few seconds and sixty minutes, wherein the cache is an aggregation of tables from the baseline database.

* * * * *